US007311027B1

(12) United States Patent
Tatsuno

(10) Patent No.: US 7,311,027 B1
(45) Date of Patent: Dec. 25, 2007

(54) ELECTRIC SCREWDRIVER

(75) Inventor: Koji Tatsuno, Osaka (JP)

(73) Assignee: Uryu Seisaku Ltd., Osaka (JP)

( * ) Notice: Subject to any disclaimer, the term of this patent is extended or adjusted under 35 U.S.C. 154(b) by 0 days.

(21) Appl. No.: 11/639,154

(22) Filed: Dec. 15, 2006

(51) Int. Cl.
*B25B 23/151* (2006.01)
*B25B 23/157* (2006.01)
*B23Q 5/20* (2006.01)

(52) U.S. Cl. .......................... 81/469; 81/473; 173/176

(58) Field of Classification Search .................. 81/469, 81/473; 173/4, 5, 176
See application file for complete search history.

(56) References Cited

U.S. PATENT DOCUMENTS 1,963,855 A * 6/1934 Franz ............................ 81/54
3,030,839 A * 4/1962 Schadlich .................... 73/93.6
3,349,651 A * 10/1967 Turnbull et al. .............. 81/464
5,848,655 A * 12/1998 Cooper et al. .............. 173/176
6,836,614 B2 * 12/2004 Gilmore ...................... 388/811

* cited by examiner

*Primary Examiner*—David B. Thomas
(74) *Attorney, Agent, or Firm*—Wenderoth, Lind & Ponack, L.L.P.

(57) ABSTRACT

An electric screwdriver capable of reducing the reactive force produced on the occasion of a screw tightening work, etc. The electric screwdriver is designed to transmit the rotational driving force of a first motor to the bit through a bit holder, and it includes a flywheel rotatively driven by a second motor in the direction same as the direction of rotation of the bit holder, a brake generating a reactive force in the direction offsetting the reactive force transmitted from the bit to the body casing through the bit holder, by braking the flywheel, and a brake operating mechanism for operating the brake in response to the magnitude of the reactive force transmitted from the bit to the body casing through the bit holder.

5 Claims, 7 Drawing Sheets

ELECTRIC SCREWDRIVER

BACKGROUND OF THE INVENTION

The present invention concerns an electric screwdriver used for screw tightening work, etc. in the assembling processes of automobiles and electronic equipment, more specifically an electric screwdriver capable of reducing the reactive force produced on the occasion of a screw tightening work, etc.

Conventionally, an electric screwdriver is generally used for screw tightening work, etc. in the assembling processes of automobiles and electronic equipment (see JP2001-62745A, for example).

By the way, this type of electric screwdriver is realized, generally, by interposing a clutch mechanism between the motor as driving source for rotation and the bit holder holding the screwdriving bit so that, in case a load with a torque no lower than prescribed level is applied to the bit holder during a screw tightening work, said clutch mechanism may work to shut off the transmission of motive power to the screwdriving bit, and by further comprising a tightening torque control means for shutting the power application to the motor, as required, to be capable of accurately controlling the tightening torque.

As described above, for the conventional electric screwdriver, various considerations were given in the matter of control of tightening torque, but no particular considerations were given, on the other hand, about the reactive force produced on the occasion of a screw tightening work. For that reason, there were such problems as fatigue of the worker holding the electric screwdriver with a long time of screw tightening work, because of the load applied on him, and drop of screw tightening accuracy due to changes in the holding state of the electric screwdriver by the worker, under the influences of reactive force, etc.

SUMMARY OF THE INVENTION

The objective of the present invention, realized in consideration of the above-described problems of the conventional electric screwdriver, is to provide an electric screwdriver capable of reducing the reactive force produced on the occasion of a screw tightening work, etc.

To achieve said objective, the electric screwdriver of the present invention is an electric screwdriver designed to transmit the rotational driving force of a motor to the bit through a bit holder, characterized in that it comprises a flywheel rotatively driven by a motor in the direction same as the direction of rotation of said bit holder, a brake generating a reactive force in the direction offsetting the reactive force transmitted from the bit to the body casing through the bit holder, by braking the flywheel, and a brake operating mechanism for operating said brake in response to the magnitude of the reactive force transmitted from the bit to the body casing through the bit holder.

In this case, the motor for rotatively driving the bit holder and the motor for rotatively driving the flywheel may be provided either individually or in common.

Moreover, the driving of the motor may be made intermittently.

According to the electric screwdriver of the present invention, it becomes possible to brake the flywheel by operating a brake by means of a brake operating mechanism, depending on the magnitude of the reactive force transmitted from the bit to the body casing through the bit holder, and generate a reactive force in the direction offsetting the reactive force, so as to reduce the reactive force produced on the occasion of a screw tightening work, etc.

This makes it possible to reduce the load applied to the worker holding the electric screwdriver, and improve the screw tightening accuracy, without changes in the holding state of the electric screwdriver by the worker, under the influences of reactive force, etc.

Furthermore, the motor for rotatively driving the bit holder and the motor for rotatively driving the flywheel may be provided either individually or in common, depending on the state of use of the electric screwdriver, etc.

Still more, by making the driving with the motor intermittently, it becomes possible to accurately reduce the reactive force produced on the occasion of a screw tightening work, etc., even in the case of a long tightening time or case in which a large torque is produced, etc.

DETAILED DESCRIPTION OF THE INVENTION

Embodiments of the electric screwdriver according to the present invention will be explained below based on drawings.

Figure 1:
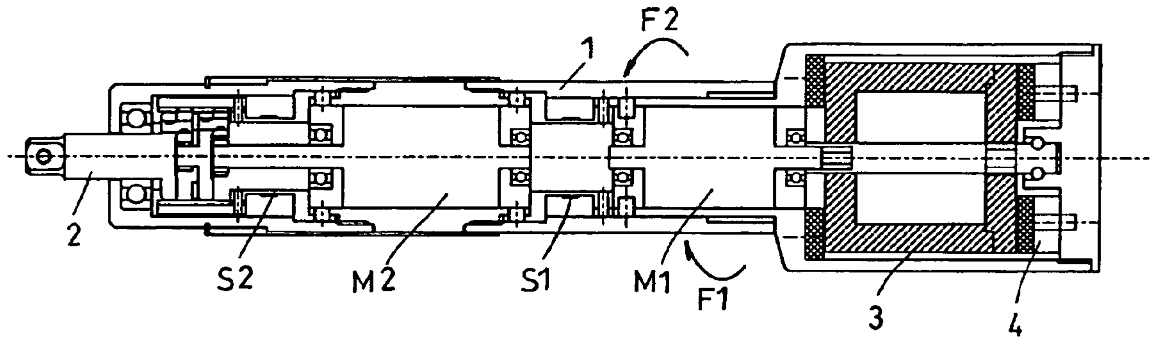
FIG. 1 is a front sectional view showing the first embodiment of the electric screwdriver according to the present invention.
Figure 2:
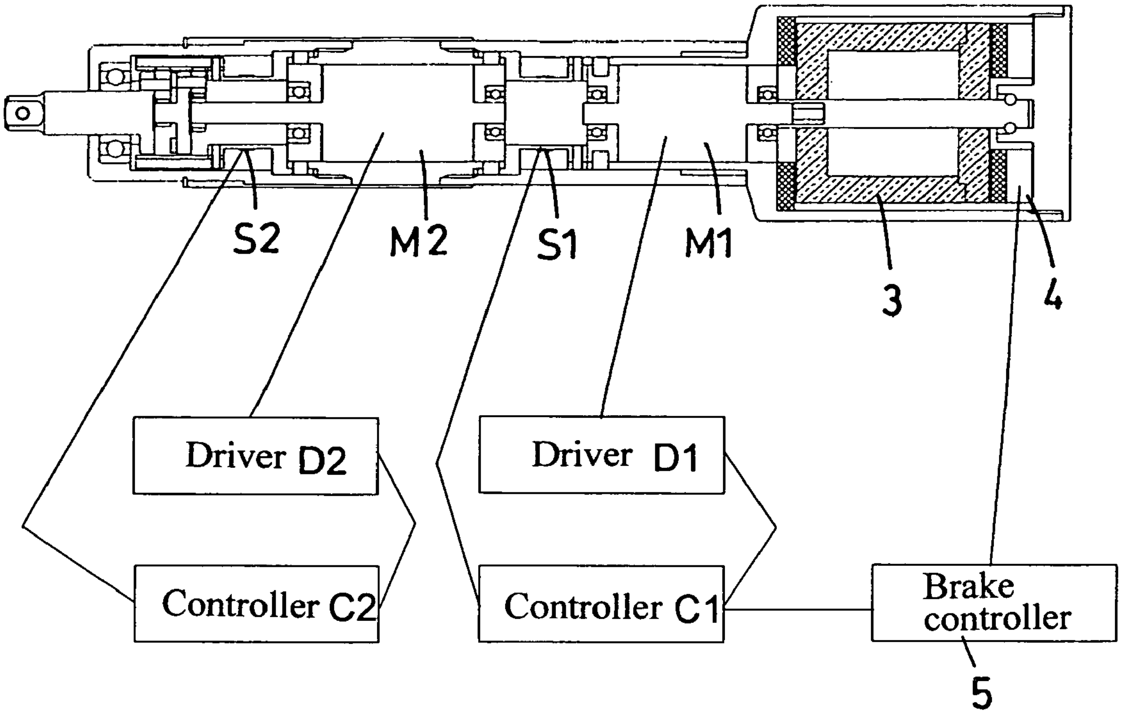
FIG. 2 is an explanatory drawing showing the control system for above.
Figure 3:
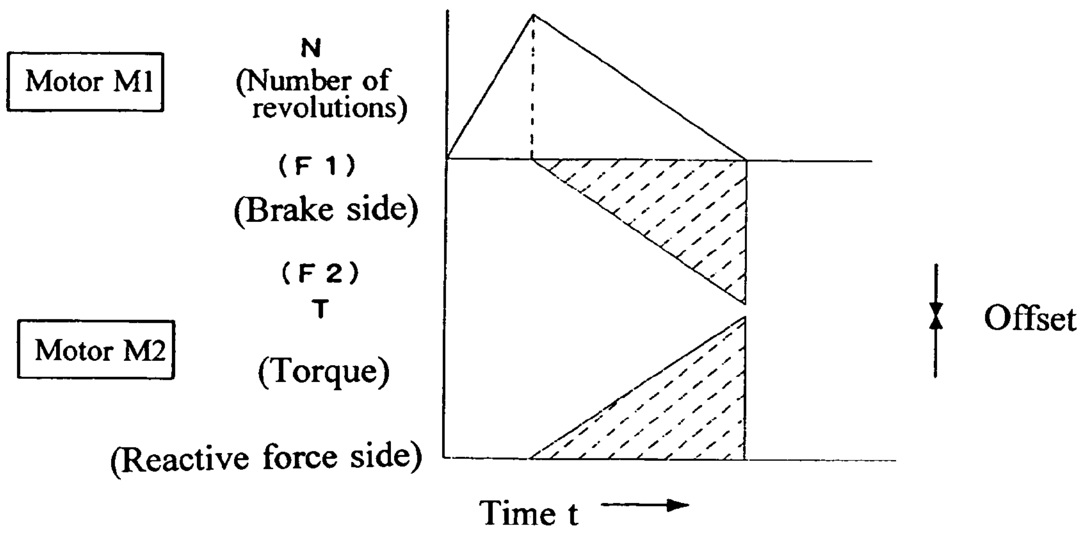
FIG. 3 is an explanatory drawing showing the relationship between the reactive force F2 transmitted from the bit of above to the body casing through the bit holder and the reactive force F1 in the direction offsetting it, FIG. 3 (*a*) indicating a case where the motor is rotatively driven once, and FIG. 3 (*b*) a case where the motor is submitted to an intermittent driving operation respectively.
Figure 3:
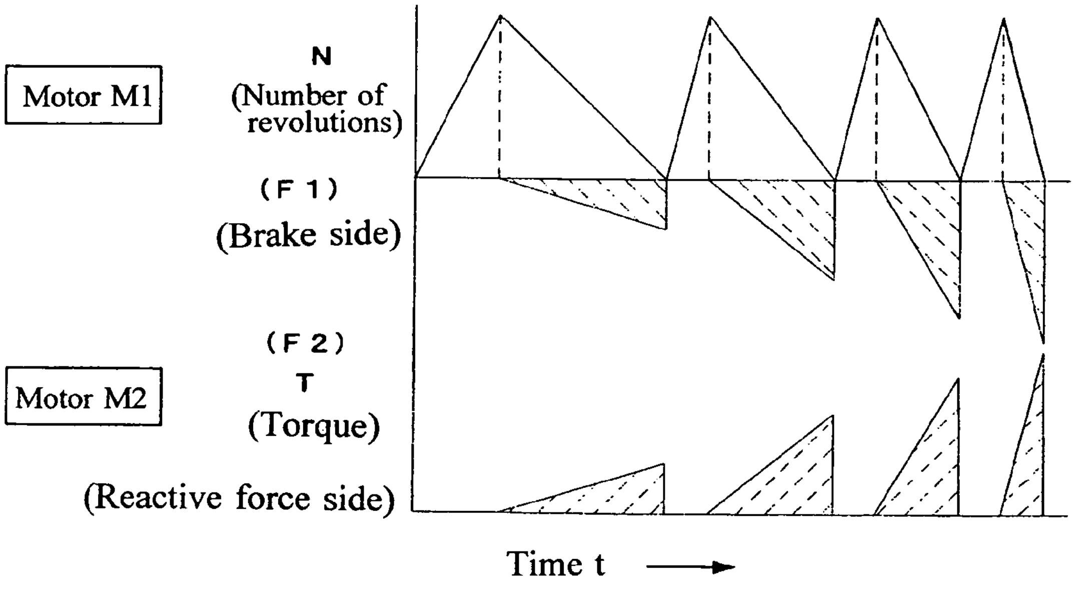

FIG. 1 to FIG. 3 indicate the first embodiment of the electric screwdriver according to the present invention.

This electric screwdriver is a electric screwdriver designed to transmit the rotational driving force of a motor M2 to the bit (not illustrated) through a bit holder 2, characterized in that it comprises a flywheel 3 rotatively driven by a motor M1 other than said motor M2 in the direction same as the direction of rotation of the bit holder 2, a brake 4 generating a reactive force F1 in the direction offsetting the reactive force F2 transmitted from the bit to the body casing 1 through the bit holder 2, by braking this flywheel 3, and a brake operating mechanism 5 for operating the brake 4 in response to the magnitude of the reactive force F2 transmitted from the bit to the body casing 1 through the bit holder 2.

In this case, the motor M1 rotatively driving the flywheel 3 is driven and controlled by a controller C1 and a driver D1, in response to the output signal of a torque sensor S1 disposed at a proper position of the body casing 1.

Moreover, the output signal of the torque sensor S1 is transmitted through the controller C1 to the brake operating mechanism (brake controller) 5, and the brake operating mechanism (brake controller) 5 operates the brake 4, depending on the magnitude of the reactive force F2, transmitted from the bit to the body casing 1 through the bit holder 2, detected by the torque sensor S1.

The operation of the brake 4 may be made by means of an optional urging mechanism such as electromagnet, etc.

And, as the brake 4 works, the flywheel 3 is braked and it becomes possible to reduce the reactive force produced on the occasion of a screw tightening work, etc., by generating a reactive force F1 in the direction offsetting the reactive force F2 transmitted from the bit to the body casing 1 through the bit holder 2.

The magnitude of the reactive force F1 (brake torque) can be expressed with the following formula:

$$T=GD^2\times N/(375\times t\times 9.8)$$

where,

TL Torque of reactive force F1 (brake torque)

$GD^2$ : Value of inertial force

N: Number of revolutions t: Braking time

This makes it possible to reduce the load applied to the worker holding the electric screwdriver, and improve the screw tightening accuracy, without changes in the holding state of the electric screwdriver by the worker, under the influences of the reactive force F2.

On the other hand, the motor M2 rotatively driving the bit holder 2 is driven and controlled by a controller C2 and a driver D2, in response to the output signal of a torque sensor S2 disposed at a proper position of the body casing 1.

By the way, the screw tightening operation is made, usually, in such a way as to drive the motor M2 rotatively driving the bit holder 2 once and, in response to this operation, drive the motor M1 rotatively driving the flywheel 3 once, and that the brake operating mechanism (brake controller) 5 operates the brake 4, depending on the magnitude of the reactive force F2, transmitted from the bit to the body casing 1 through the bit holder 2, detected by the torque sensor S1, as shown in FIG. 3 (*a*). However, there are cases where the reactive force F1 in the direction offsetting the reactive force F2 transmitted from the bit to the body casing 1 through the bit holder 2 becomes short, in the case of a long tightening time or case in which a large torque is produced, etc.

In such cases, it is so arranged as to drive the motor M2 rotatively driving the bit holder 2 intermittently (4 times in the illustrated embodiment) and, in response to this operation, drive the motor M1 rotatively driving the flywheel 3 intermittently (4 times in the illustrated embodiment), and that the brake operating mechanism (brake controller) 5 operates the brake 4, depending on the magnitude of the reactive force F2, transmitted from the bit to the body casing 1 through the bit holder 2, detected by the torque sensor S1, as shown in FIG. 3 (*b*).

As explained above, by performing the driving of the motors M1, M2 intermittently, it becomes possible to accurately reduce the reactive force produced on the occasion of a screw tightening work, etc., even in the case of a long tightening time or case in which a large torque is produced, etc.

Figure 4:
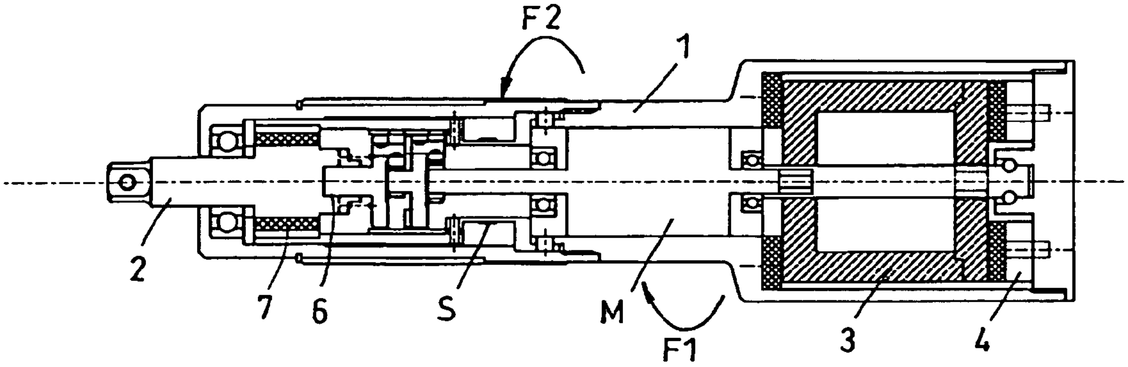
FIG. 4 is a front sectional view showing the second embodiment of the electric screwdriver according to the present invention.
Figure 5:
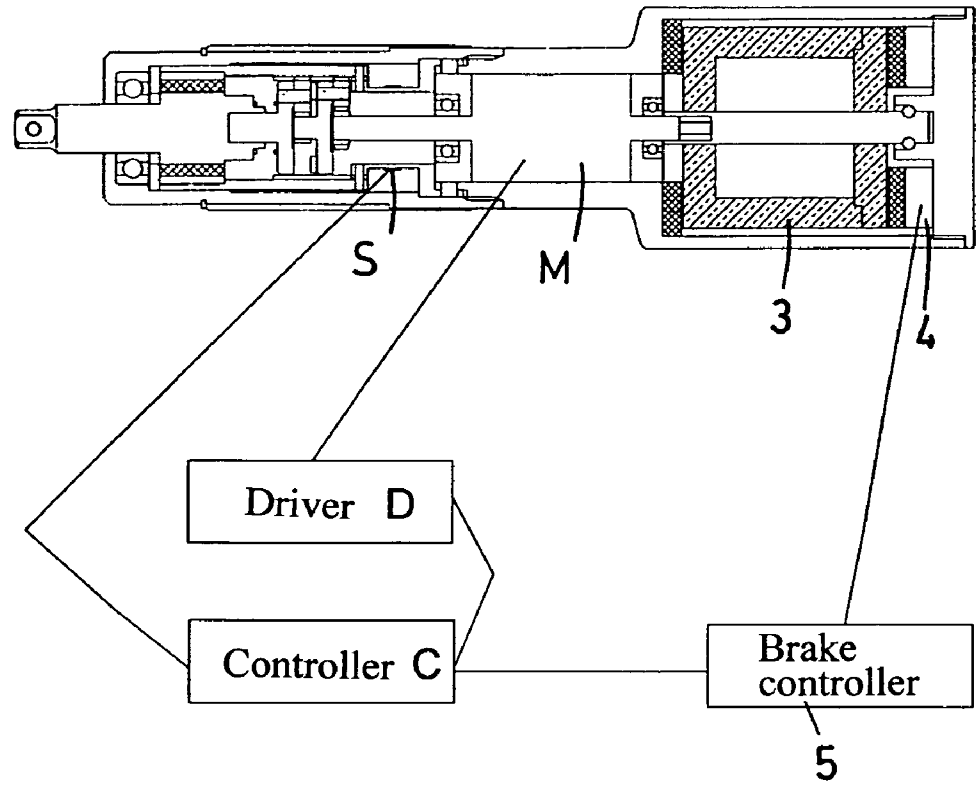
FIG. 5 is an explanatory drawing showing the control system for above.
Figure 6:
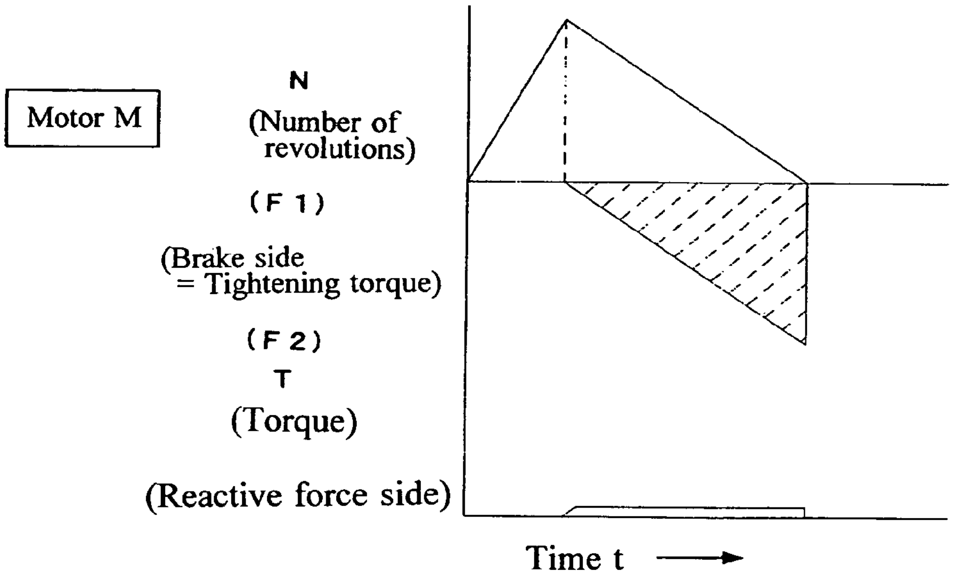
FIG. 6 is an explanatory drawing showing the relationship between the reactive force F2 transmitted from the bit of above to the body casing through the bit holder and the reactive force F1 in the direction offsetting it, FIG. 6 (*a*) indicating a case where the motor is rotatively driven once, and FIG. 6 (*b*) a case where the motor is submitted to an intermittent driving operation respectively.
Figure 6:
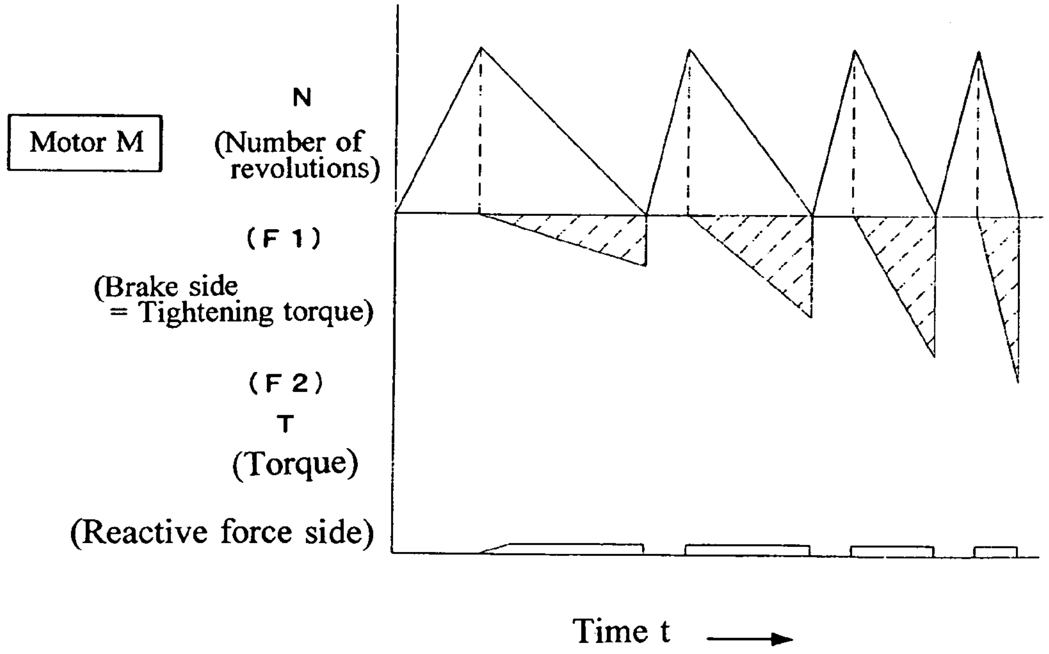

FIG. 4 to FIG. 6 indicate the second embodiment of the electric screwdriver according to the present invention.

This electric screwdriver is an electric screwdriver designed to transmit the rotational driving force of a motor M to the bit (not illustrated) through a bit holder 2, characterized in that it comprises a flywheel 3 rotatively driven by a motor M common to said motor M in the direction same as the direction of rotation of the bit holder 2, a brake 4 generating a reactive force F1 in the direction offsetting the reactive force F2 transmitted from the bit to the body casing 1 through the bit holder 2, by braking this flywheel 3, and a brake operating mechanism 5 for operating the brake 4 in response to the magnitude of the reactive force F2 transmitted from the bit to the body casing 1 through the bit holder 2.

In this case, the motor M is driven and controlled by a controller C and a driver D, in response to the output signal of a torque sensor S disposed at a proper position of the body casing 1.

Moreover, the output signal of the torque sensor S is transmitted through the controller C to the brake operating mechanism (brake controller) 5, and the brake operating mechanism (brake controller) 5 operates the brake 4, depending on the magnitude of the reactive force F2, transmitted from the bit to the body casing 1 through the bit holder 2, detected by the torque sensor S.

And, as the brake 4 works, the flywheel 3 is braked and it becomes possible to reduce the reactive force produced on the occasion of a screw tightening work, etc., by generating a reactive force F1 in the direction offsetting the reactive force F2 transmitted from the bit to the body casing 1 through the bit holder 2.

This makes it possible to reduce the load applied to the worker holding the electric screwdriver, and improve the screw tightening accuracy, without changes in the holding state of the electric screwdriver by the worker, under the influences of the reactive force F2.

On the other hand, the motor M is connected to the bit holder 2 through a slide clutch 6, to thereby keep the bit holder 2 in an idling state, after making the tightening until the screw is sealed to make free running with the side clutch 6, on the occasion of a screw tightening work, etc.

Furthermore, a one-way clutch 7 is disposed between the outer circumferential face of the bit holder 2 and the inner circumferential face of the body casing 1. As a result, the reactive force (torque) F1 generated with working of the brake 4 works as tightening torque through the one-way clutch 7.

And, while the screw tightening operation is made, usually, in such a way as to drive the motor M once, as shown in FIG. 6 (*a*), even in the case where a single motor M is commonly used, as in this embodiment, the motor M is driven intermittently (4 times in the illustrated embodiment), as shown in FIG. 6 (*b*), in the case of a long tightening time or case in which a large torque is produced, etc.

As explained above, by performing the driving of the motor M intermittently, it becomes possible to accurately reduce the reactive force produced on the occasion of a screw tightening work, etc., even in the case of a long tightening time or case in which a large torque is produced, etc.

By the way, various types of torque sensor such as strain gauge type sensor, magnetic strain gauge type sensor, etc. can be used as torque sensors S, S1, S2.

Figure 7:
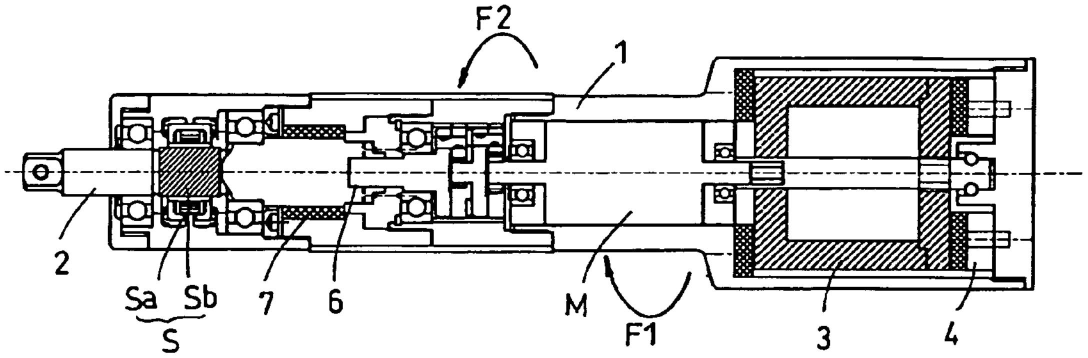
FIG. 7 is a front sectional view showing a modified example of the second embodiment of the electric screwdriver according to the present invention.

Said first embodiment and second embodiment use a strain gauge type sensor for the torque sensors S, S1, S2, while the modified example of the second embodiment of the electric screwdriver according to the present invention indicated in FIG. 7 uses a magnetic strain gauge type sensor for the torque sensor S.

Here, the magnetic strain gauge type sensor is designed to detect changes in the magnetic permeability of the bit holder 2 provided with grooving Sb as changes in the output voltage of the detecting coil (proportional to the magnitude of the torque), by means of an exciting coil and a detecting coil Sa disposed in a way to turn around the bit holder 2.

Explanation has so far been made on the electric screwdriver according to the present invention, based on a plurality of embodiments. However, the present invention is not restricted to the constructions described in the above-described embodiments, but may be changed in construction as required to the extent not deviating from its purpose, such as combining the constructions described in the respective embodiments as required, or reversing the direction of rotation of the motors M, M1, M2, etc.

The electric screwdriver according to the present invention, capable of reducing the reactive force produced on the occasion of a screw tightening work, etc., can not only be used suitably for electric screwdrivers used for applications in which a large reactive force is generated during a screw tightening work or applications with a long time of screw tightening work, but also be widely used as electric driver used for applications in which a high screw tightening accuracy is required, etc., for example.

The invention claimed is:

1. An electric screwdriver, for use with a bit, said electric screwdriver comprising:

a body casing, a bit holder, a motor for imparting a rotational driving force to the bit through said bit holder in a direction of rotation, a flywheel rotatively driven by said motor in a direction same as the direction of rotation of said bit holder, a brake for generating a reactive force in a direction offsetting a reactive force transmitted from the bit to said body casing through said bit holder, by braking said flywheel, and a brake operating mechanism for operating said brake in response to the magnitude of the reactive force transmitted from the bit to said body casing through said bit holder.

2. An electric screwdriver as defined in claim 1, wherein driving of the motor is intermittent.

3. An electric screwdriver, for use with a bit, said electric screwdriver comprising:

a body casing, a bit holder, a first motor for imparting a rotational driving force to the bit through said bit holder in a direction of rotation, a second motor, a flywheel rotatively driven by said second motor in a direction same as the direction of rotation of said bit holder, a brake for generating a reactive force in a direction offsetting a reactive force transmitted from the bit to said body casing through said bit holder, by braking said flywheel, and a brake operating mechanism for operating said brake in response to the magnitude of the reactive force transmitted from the bit to said body casing through said bit holder.

4. An electric screwdriver as defined in claim 3, wherein driving of the first motor is intermittent.

5. An electric screwdriver as defined in claim 3, wherein driving of the second motor is intermittent.

* * * * *